W. I. FREEMAN.
TRAP SPRING.
APPLICATION FILED APR. 23, 1920.

1,366,375.

Patented Jan. 25, 1921.

Inventor
W. I. Freeman

UNITED STATES PATENT OFFICE.

WAYLAND I. FREEMAN, OF SPRING VALLEY, MINNESOTA.

TRAP-SPRING.

1,366,375.   Specification of Letters Patent.   Patented Jan. 25, 1921.

Application filed April 23, 1920. Serial No. 376,053.

*To all whom it may concern:*

Be it known that I, WAYLAND I. FREEMAN, a citizen of the United States, residing at Spring Valley, in the county of Fillmore and State of Minnesota, have invented a new and useful Trap-Spring, of which the following is a specification.

It is the object of this invention to provide novel means for securing a reinforcing spring to the spring of a trap.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1:
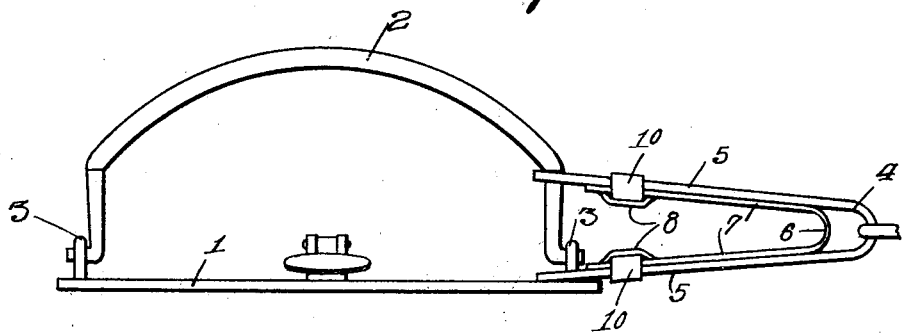
Figure 2:
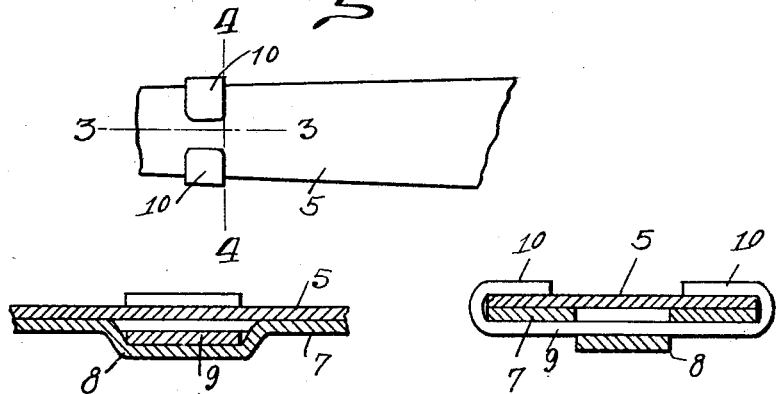
Figure 3:
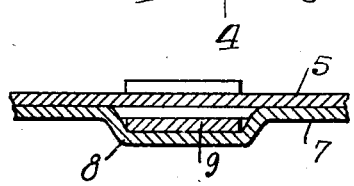
Figure 4:
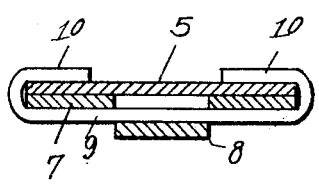

Figure 1 shows in side elevation, a trap of known construction, equipped with the device forming the subject matter of this application; Fig. 2 is a fragmental top plan showing one of the arms of the trap spring and attendant parts; Fig. 3 is a section on the line 3—3 of Fig. 2; and Fig. 4 is a section on the line 4—4 of Fig. 2.

In Fig. 1 of the drawings there appears a steel trap of common construction, including a base 1 and jaws 2 united by pivot means 3 with the base 1. A U-shaped spring 4 is shown, and includes arms 5. One arm 5 rests on the base 1, one of the pivoting means 3 passing through said arm. In the other arm 5 of the spring 4, the terminal portions of the jaws 2 are slidably mounted—all as common and well understood by those skilled in the art.

In carrying out the invention there is provided a U-shaped resilient member 6 preferably made of steel, and including arms 7. The U-shaped member 6 is located within the trap spring 4, the arms 7 of the member 6 coöperating with the arms 5 of the trap spring 4. Keepers 8 extend longitudinally of the arms 7 of the resilient member 6, the keepers being struck from the arms. U-shaped metal strips 9 are inserted through the keepers 8 and extend transversely of the arms 7. The ends 10 of the strips 9 are clenched on the arms 5 of the trap spring 4, as clearly shown in Fig. 4.

Owing to the fact that the separable strips 9 are provided, the strips may be made of some metal which will bend more readily than will the metal out of which the resilient metal 6 is fashioned, this construction facilitating the clenching of the ends 10 of the strips on the arms 5 of the trap spring 4. Further, if one of the strips 9 should happen to be broken, during the bending of the ends 10, it is not necessary to throw away the entire spring 6, it being possible merely to slip in the other strip 9 in place of the one broken.

Having thus described the invention, what is claimed is:—

A reinforcement for trap springs, comprising a U-shaped member including arms having longitudinal keepers struck therefrom; and strips inserted through the keepers transversely of the arms, the ends of the strips bendable for clenching upon a trap spring.

In testimony that I claim the foregoing as my own, I have hereto affixed my signature in the presence of two witnesses.

WAYLAND I. FREEMAN.

Witnesses:
C. S. LOUCKS,
S. H. STEFFENS.